Oct. 18, 1955                L. SOMMER                 2,721,047
FLYING APPARATUS, PARTICULARLY FOR TESTING FLYING WINGS
Filed March 11, 1953                          2 Sheets-Sheet 1
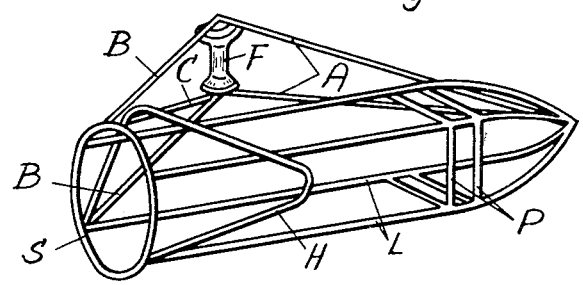
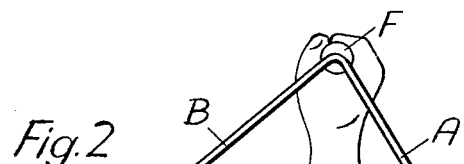
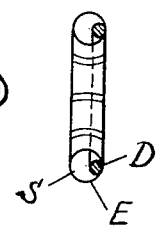
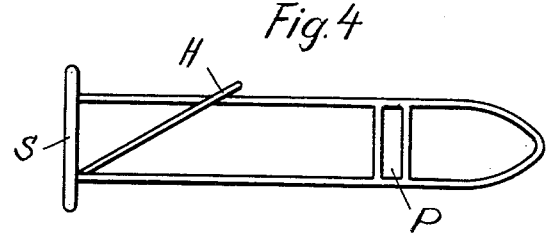

Oct. 18, 1955     L. SOMMER     2,721,047
FLYING APPARATUS, PARTICULARLY FOR TESTING FLYING WINGS
Filed March 11, 1953     2 Sheets-Sheet 2
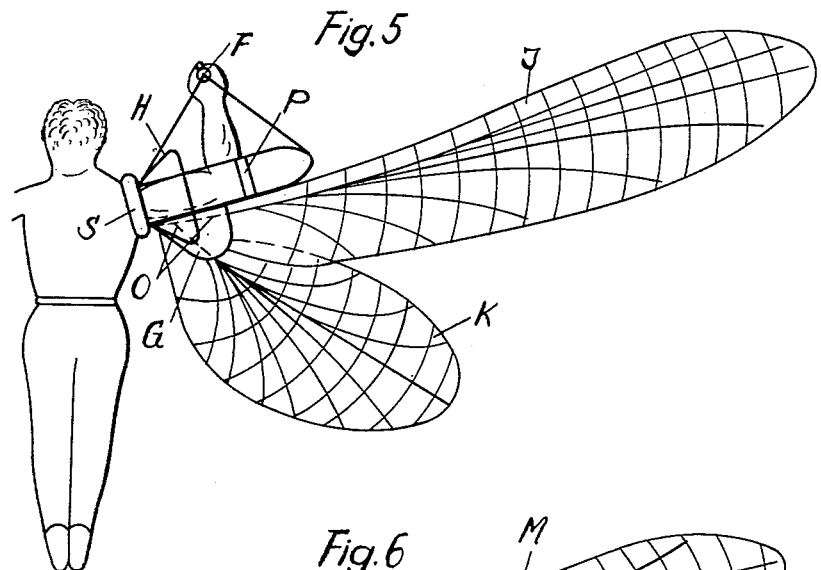
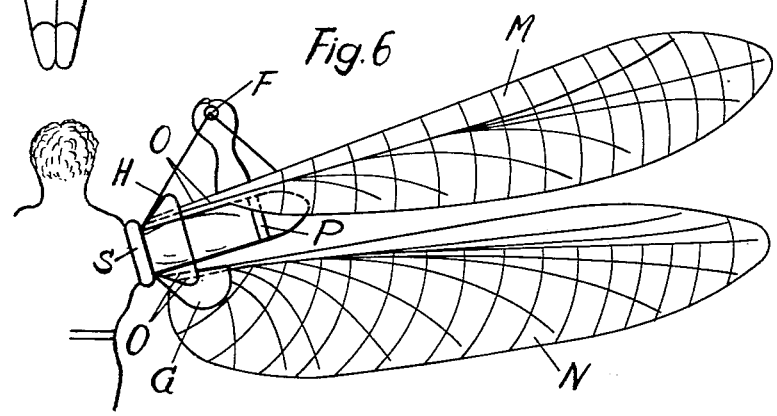
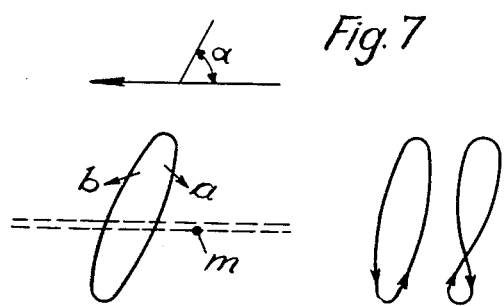

United States Patent Office 2,721,047
Patented Oct. 18, 1955

2,721,047

FLYING APPARATUS, PARTICULARLY FOR TESTING FLYING WINGS

Ludwig Sommer, Stuttgart, Germany

Application March 11, 1953, Serial No. 341,691

10 Claims. (Cl. 244—64)

The invention relates to a flying apparatus, particularly to an apparatus for testing flying wings.

An object of the invention is the provision of an apparatus affording the use of flexible flying wings for flying without mechanical power, that is, for flying with muscular power only.

Another object of the invention is the provision of simple means for testing flexible flying wings operated by muscular power.

The development of aviation and of the aerodynamic science results in the perception that flying with muscular power as in the animal kingdom is hardly possible for mankind, or only for a short time at best and with a great effort. This perception is based on the assumption that the flying apparatus must be relatively heavy in comparison with the weight of man, and that at least 0.5 up to 1.0 H. P. is needed for producing the required lift.

This is only true as long as no means are provided increasing the lift of a wing-flapping apparatus to twofold or threefold the lift produced by conventional wing or airscrew blade profiles of the same size.

The invention is based on the knowledge obtained by testing many models that under certain conditions of motion, flying wings which are in part flexible in the direction of the wing span, but also particularly in the direction of the direction of flight, that is, the profiles of which influencing the air flow may be periodically varied, produce lifting and propelling powers considerably greater than inflexible wings having a similar profile, which are moved through the air either at a constant speed and of a constant angle of attack or oscillatingly. The discovery of the most favorable shape and the kind of motion of such flexible flying wings involved more difficulties than the development of the rigid wing form of a common airplane. In the latter case, the mostly stationary flow conditions must be considered, whereas periodically changing flow conditions must carefully be avoided to prevent fluttering of the wings.

In the case of flexible wings not only the profile and the contour shapes must be investigated, but also the periodical variations in co-operation with the variable air powers at several frequencies of swing. The complexity of these relations is the principal reason why the problem of the wing-flapping flight has not yet been solved for mechanical or muscular power drive.

The invention affords the use of wings for motorless flying, that is, of flying by muscular power only and of testing them by simple means, the fundamental shape and kind of motion of such wings being predetermined. The apparatus according to the invention includes two structures which are movable independently of each other, each structure being connected with an arm of the testing person and provided with flexible wings similar to animal wings, preferably insect wings, the profiles of which control the air flow being periodically variable.

Preferably, two structures rigid in themselves and independent of each other, each structure being connected with an arm of the testing person, the wings being easily detachably mounted, for instance by means of screw connections.

The apparatus described below is light and simple and makes it possible to carry wings corresponding to the peculiarity of the human body and to move the wings freely with a good utilization of muscular power. The obtained effect may be thoroughly observed by a testing person who is running or standing in a strong air current.

By a combination with suitable means for producing certain testing speeds and for measuring power, numerical results as to the aerodynamical effects of flying wings of different shapes, of flexibility and of kind of motion may be gained by towing experiments by means of vehicles, airplanes or in a wind tunnel. In this way many designs and forms of motion of flying wings can be investigated as to their usability. The thus found suitable solutions may be matured by technical development usual in the art of aeronautics and may be used to develop the wing-flapping flying which has been neglected up to now.

The device according to the invention is designed to permit movement of the wings in all directions and to be rotatable about their axis as much as 120°. The possible total amplitude of swing amounts to about 90°, the upward movement thereof, that is, toward the back of the testing person, amounting to about 45°. The connection of the two supporting structures of the wings, independent of each other, with the body is established by means of a laticework tightly enclosing the upper arm at the body, for instance by means of a cushioned ring, and tightly encasing it at the elbow-joint by means of cushions, one of which being at the top, another of which being at the bottom, and a third cushion being at the outside of the elbow. Air cushions may be used for this purpose.

The forearm and the upper arm form about a right angle, so that the hand can grasp a handle fixed in front of the device for guiding and regulating the wings, the powerful upper arm being substantially used for carrying the load.

A reliable connection between the supporting structure of the wings and the body is produced by adapting the dimensions of the supporting structure to the body of the testing person.

To provide for the above-mentioned amplitude of swing to the rear, i. e., in the position of flight to the top, the wings must be so connected with the supporting structure of the wings that the plane of the wings in the neutral position forms an angle of about 30 to 40° with the plane in which the axes of the forearm and of the upper arm lie, in the direction from the wing tip to the wing root. This is necessary, because the structure of the human body would not allow a correspondingly wide guidance of the wings to the rear without the said provisions.

In the accompanying drawings Fig. 1 is a perspective and schematic illustration of a supporting structure of the wings according to the invention;

Fig. 2 is a top view of the supporting structure;

Fig. 3 is a transverse section of a detail of the supporting structure according to the invention;

Fig. 4 is a side view of the supporting structure;

Fig. 5 is a top view of the flying apparatus according to the invention;

Fig. 6 is a top view of a modified flying apparatus according to the invention;

Fig. 7 is a diagrammatic showing of movements of the outer wing portions of a flying apparatus according to the invention.

The same numerals designate the same parts in all figures.

Referring more particularly to Fig. 1 of the drawing, the testing person puts his arm through the shoulder ring S. Four longitudinal bars L extend from the shoulder ring S, the right ends of the bars being parabolically bent and united in a point which is connected with the handle F by means of two bars A, the handle being also connected with the shoulder ring S by means of a brace including two parallel bars B and a diagonal bar C. Three sides of the prism formed by the four longitudinal bars L are connected by transverse bars P for supporting the cushions for the elbow bracket H having two arms, the ends of which are connected with the lower part of the shoulder ring S, the arms extending beyond opposed sides of the support frame SLP and being connected with a transverse portion extending across the top of the support frame, serves to receive the wing spars. The latter are fastened to the bracket H, for instance by screws so as to be easily interchangeable. A plywood or an aluminum plate G may be added for this purpose.

Figure 2 illustrates the supporting frame in which the arm bent in a right angle is inserted and is supported at P, the hand of the flying person grasping the handle F. The wing spars are fastened in front and in the rear of the upper arm by clamping or screwing; the position of the upper arm is not impeded by the wing spars.

The shoulder ring S shown in Fig. 3 comprises a metal ring D and an air cushion E disposed at the shoulder of the testing person. The air cushion E is connected with the metal ring D by means of a rubber tape. In Fig. 4 the handle F is omitted. The inclination of the parts of the spar support H near the human body is between 30 to 40° to the plane defined by the axes of the upper arm and the forearm which are at a right angle to each other.

Fig. 5 illustrates a flying person seen from the top with the legs stretched backward. The common root of the double-wing J, K is fastened by screws to the part of the holder or bracket H which lies behind the upper arm. The spars O are connected by a plywood or light metal plate G. The wide-spanned front wing J produces lift and propulsion, the shorter-spanned rear wing K in part also produces lift and more particularly the longitudinal stability of the flying apparatus. The combined action of the two short-spanned wings fastened to the right and the left of the body may be compared with the effect which a wide-spanned bird's tail produces both in taking off and in soaring. A small part of the marginal portion of the rear wing is covered by a portion of the front wing J. This is for providing a free play for compensating longitudinal stresses occurring at certain motions in the plane. The front wing is less elastic in the direction of the span than is the rear wing.

By an appropriate guiding and twisting of the wings, whereby certain rotational movements of the wing ends are produced, which can easily be effected by means of the above described structure, relatively high lifting and propelling powers are obtained with a relatively small effort, utilizing the favorable relative winds which are produced by the aforedescribed motions.

The form of the wings preferably corresponds to the forms produced by nature, particularly to those of insects, for instance of hawk-moths, particularly of the well-known oleander-moth, furthermore, of the dragonfly, which with its two equally long wings on either side of the body has particularly favorable propelling properties. Other groups of insects, too, are good models for testing wing performances by the described apparatus.

In the embodiment shown in Fig. 5 an additional wing may be provided in front of the upper arm so that the flying apparatus would have 6 wings.

Fig. 6 illustrates an embodiment having a wing M in front and a wing N behind each upper arm. The wing N may be made wide near the body in contrast to the front wing, with which this is not feasible. G indicates a plywood plate and O the main spars. The latter are substantially parallel, if seen from the top of the wings.

If the rear wing N would be placed in the angular position of the rear wing K in Fig. 5, the front wing M of Fig. 6, too, might be made very wide near the body, that is, it might have a great lifting power near the body.

In the construction of the wings according to the modifications shown in Figs. 5 and 6 the stronger ribs are preferably made of ash wood, and umbrella ribs are preferably used for the lighter ribs and for some of the transverse connections, the ribs in the wing parts, which need be less stiff may be made of aluminum wire. The invention is not restricted to these materials. For covering the wings an air and waterproof fabric or parachute silk is used. The covering may be provided on one or on either side.

Fig. 7 schematicaly illustrates the rotational movement of the end of a wing which may be produced by applying the invention.

If the center of gravity $m$ of a horizontally flying person, seen from the side, moves from the right to left in Fig. 7, a good lifting and propelling effect will be obtained, when the outer section of the wings describes a flat ellipse as illustrated in Fig. 7. The curve illustrating the movement of the wings may also have the shape of an elongated egg with the tapered end downward or of an 8 with the small loop downward (Fig. 7a). The longitudinal axis of these shapes forms an acute angle $\alpha$ with the direction of flight. The inclination of the outer section of the wing plane is somewhat forward and upward during the upward movement (arrow $a$), and is somewhat forward and downward during the downward movement (arrow $b$). For the sake of clearness, the inclinations are exaggerated in the drawing.

The upward movement is produced without a particular expenditure of power only by guiding, whereas the downward movement is effected at a great strain of the muscular system of the upper arm and of the upper part of the body. In Fig. 7 the center of gravity $m$ lies behind the ellipse and a little deeper than its central point. Thus a pull ahead and also upward is caused by the movement of the wings. For bringing about such a propelling power, the muscular system of the upper arm and of the upper part of the body of a healthy and robust young man will well answer the requirements. The flyer must not directly lift his weight in applying the invention.

Due to the inclination of the wing area ahead upward, that is, when a positive angle of attack exists during the upward movement, a lifting power must automatically occur. A strong downward movement causes both a propelling and a lifting. A propelling must only be effected periodically—presumably no more frequently than once per second in a fast flight—whereas there is a lifting at the upward as well as at the downward movement of the wings.

What I claim is:

1. A man-actuated flying apparatus comprising two independent support frames, one for each arm of the flying person, and wings connected with each of said support frames, each of said support frames including a straight rigid boxlike frame portion made of a plurality of straight parallel longitudinal bars and of curved bars transversely interconnecting said straight bars, said boxlike frame portion encasing the upper arm and the elbow of the flying person, a frame portion laterally extending from said boxlike frame and including a handle adapted to be grasped by the hand of the flying person when the forearm and the upper arm of the flying person form substantially a right angle.

2. A a man-actuated flying apparatus comprising two independent support frames, one for each arm of the flying person, and wings connected with each of said support frames, said support frames being adapted to individually receive a rectangularly bent arm of the flying person, each of said wings including a main spar connected with one of said support frames, the planes of the wings individually forming an angle of 30° to 40° with the planes including the respective rectangularly bent arm of the flying person.

3. A man-actuated flying apparatus comprising two independent support frames, one for each arm of the flying person, and wings connected with each of said support frames, each support frame including a rigid boxlike lattice including a shoulder ring, longitudinal bars extending at a right angle from said shoulder ring, said bars having a straight portion, the straight portions of different bars being bent and interconnected at a point, a handle adapted to be grasped by the hand of the flying person when the forearm and the upper arm of the flying person form substantially a right angle, and braces connecting said handle with a side of said lattice.

4. A man-actuated flying apparatus according to claim 3, in which said support frames comprise transverse bars interconnecting the straight portions of said bars at the sides of said lattice except the side with which said braces are connected.

5. A man-actuated flying apparatus according to claim 3 comprising a cushion connected with said shoulder ring.

6. A man-actuated flying apparatus comprising two independent support frames, one for each arm of the flying person, and wings connected with each of said support frames, each support frame including a rigid boxlike lattice including a shoulder ring, longitudinal bars extending at a right angle from said shoulder ring, said bars having a straight portion, the straight portions of different bars being substantially parallel, the outer ends of said bars being bent and interconnected at a point, a handle adapted to be grasped by the hand of the flying person when the forearm and the upper arm of the flying person form substantially a right angle, braces connecting said handle with a side of said lattice, and a bracket having two arms the ends of which are connected with the lower part of said shoulder ring, said arms extending beyond opposed sides of the support frame, said bracket having a transverse portion connecting said arms and extending across the top of the support frame.

7. A man-actuated flying apparatus according to claim 6, in which said wings are interchangeably connected with said bracket.

8. A man-actuated flying apparatus according to claim 6, comprising two wings of different spans and having a common root which is connected with said bracket, the wing having the greater span being in front of the other wing, the rear wing being elastic in the direction of the span and having a forward marginal portion which is slightly overlapped by the front wing, the latter being less elastic in the direction of the span that the rear wing.

9. A man-actuated flying apparatus according to claim 6, having two wings connected with each support frame, each of said two wings having a main spar, the spar of one wing being connected with one arm of said bracket and the spar of the other wing being connected with the other arm of said bracket, said spars being substantially parallel, if seen from the top of the wings.

10. A man-actuated flying apparatus according to claim 6, in which said wings have supporting ribs extending substantially longitudinally of the wings and in which said wings have transverse ribs extending substantially in the direction of flight.

References Cited in the file of this patent

UNITED STATES PATENTS

| 398,984 | Spalding | Mar. 5, 1889 |
| 1,137,212 | Jelalian | Apr. 27, 1915 |

FOREIGN PATENTS

| 393,687 | Germany | Apr. 14, 1924 |
| 661,871 | Germany | June 29, 1938 |